United States Patent
Okitsu et al.

(10) Patent No.: US 9,334,975 B2
(45) Date of Patent: May 10, 2016

(54) RESIDUAL PRESSURE RELEASE VALVE

(75) Inventors: Masayuki Okitsu, Adachi-ku (JP); Kazuhiro Matsushita, Moriya (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 150 days.

(21) Appl. No.: 14/241,510

(22) PCT Filed: Sep. 4, 2012

(86) PCT No.: PCT/JP2012/073007
§ 371 (c)(1),
(2), (4) Date: Feb. 27, 2014

(87) PCT Pub. No.: WO2013/035877
PCT Pub. Date: Mar. 14, 2013

(65) Prior Publication Data
US 2014/0224355 A1 Aug. 14, 2014

(30) Foreign Application Priority Data

Sep. 8, 2011 (JP) .................................. 2011-195535

(51) Int. Cl.
| | | |
|---|---|---|
| *F16K 17/168* | (2006.01) | |
| *F16K 31/528* | (2006.01) | |
| *F16K 11/07* | (2006.01) | |

(52) U.S. Cl.
CPC .............. *F16K 17/168* (2013.01); *F16K 11/07* (2013.01); *F16K 31/5286* (2013.01); *Y10T 137/7794* (2015.04)

(58) Field of Classification Search
CPC ... Y10T 137/7794; F16K 35/06; F16K 35/10; F16K 35/027
See application file for complete search history.

(56) References Cited

U.S. PATENT DOCUMENTS

| | | | |
|---|---|---|---|
| 3,818,926 A * | 6/1974 | Wohlwend | ............. B25D 9/145 137/101 |
| 4,103,704 A * | 8/1978 | Richards | ................. F16K 17/06 137/522 |

(Continued)

FOREIGN PATENT DOCUMENTS

| | | |
|---|---|---|
| JP | 57-141263 U | 9/1982 |
| JP | 62-91076 U | 6/1987 |

(Continued)

OTHER PUBLICATIONS

Office Action issued Oct. 7, 2014 in Japanese Patent Application No. 2011-195535 (with partial English language translation).

(Continued)

*Primary Examiner* — Craig Schneider
*Assistant Examiner* — Kevin Barss
(74) *Attorney, Agent, or Firm* — Oblon, McClelland, Maier & Neustadt, L.L.P.

(57) ABSTRACT

A flow-through condition of a pressure fluid between first through third ports formed in a body of a residual pressure release valve is switched by a valve plug of a valve mechanism. Between an operating unit for driving the valve mechanism and the body, a converter is disposed for converting rotational movement of the operating unit into linear movement and transferring the linear movement to the valve plug. The converter includes a cylindrical shaped cam ring including a pin inserted through the valve plug, and inclined grooves for guiding the pin. The cam ring includes two divided bodies separable from each other in a radial direction.

7 Claims, 6 Drawing Sheets

(56) References Cited

U.S. PATENT DOCUMENTS

| | | | | |
|---|---|---|---|---|
| 4,784,637 A * | 11/1988 | Ryder | ............... | A61M 1/0062 604/236 |
| 4,995,421 A * | 2/1991 | Bonacorsi | ............... | F16K 11/07 137/383 |
| 5,095,949 A * | 3/1992 | Day | ............... | F16K 11/07 137/625.48 |
| 6,648,009 B1 * | 11/2003 | Craig | ............... | F16K 35/06 137/15.03 |
| 2002/0020937 A1 * | 2/2002 | Iikawa | ............... | B29C 33/005 264/239 |
| 2007/0024989 A1 * | 2/2007 | Kageyama | ............... | G02B 7/04 359/699 |
| 2010/0282348 A1 * | 11/2010 | Sharp | ............... | F16K 11/07 137/625.46 |
| 2013/0074956 A1 * | 3/2013 | Okitsu | ............... | G05D 16/163 137/505 |

FOREIGN PATENT DOCUMENTS

| | | |
|---|---|---|
| JP | 4-47495 Y2 | 11/1992 |
| JP | 2000 145985 | 5/2000 |
| JP | 2006-258181 A | 9/2006 |
| TW | 265400 | 12/1995 |
| TW | M334900 U | 6/2008 |

OTHER PUBLICATIONS

International Search Report Issued Dec. 19, 2012 in PCT/JP12/073007 Filed Sep. 4, 2012.

Written Opinion of the International Searching Authority Issued Dec. 19, 2012 in PCT/JP12/073007 Filed Sep. 4, 2012.

Combined Taiwanese Office Action and Search Report issued Apr. 28, 2014 in Patent Application No. 101132131 (with partial English translation).

Japanese Office Action issued Mar. 4, 2014 in Patent Application No. 2011-195535 with Partial English Translation.

\* cited by examiner

RESIDUAL PRESSURE RELEASE VALVE

TECHNICAL FIELD

The present invention relates to a residual pressure release valve disposed between a pressure fluid supply source and a fluid pressure device, and which is capable of releasing a pressure that remains on a side of the fluid pressure device.

BACKGROUND ART

The present applicant has proposed a residual pressure release valve disposed between a fluid pressure supply source, which supplies a pressure fluid, and a fluid pressure device, which is operated by supplying the pressure fluid thereto, for discharging residual pressure fluid remaining between the fluid pressure supply source and the fluid pressure device (see Japanese Laid-Open Patent Publication No. 2000-145985).

SUMMARY OF INVENTION

A principal object of the present invention is to provide a residual pressure release valve, which is capable of facilitating and improving assembly thereof.

According to an embodiment of the present invention, a residual pressure release valve is provided comprising a body having first and second ports through which a pressure fluid is supplied and discharged, and a third port that communicates with the first and second ports through a communication chamber, a valve mechanism disposed inside the body and having a valve plug for switching a flow-through condition of the pressure fluid between the first through third ports, and an operating unit for operating the valve mechanism.

The residual pressure release valve further comprises a converting means disposed rotatably with respect to the body, for converting rotational movement of the operating unit into linear movement between the operating unit and the body, and transferring the linear movement to the valve plug.

The converting means is constituted from a pin inserted through the valve plug, and a cylindrical shaped cam ring having an inclined groove therein for guiding the pin, the cam ring being formed from two divided bodies which are separable from each other in a radial direction.

According to the present invention, the converting means is provided between the body and the operating unit for operating the valve mechanism, which serves to convert rotational movement of the rotatable operating unit into linear movement and to transfer the linear movement to the valve plug of the valve mechanism. Further, the converting means includes inclined grooves, which guide the pin that is inserted through the valve plug, the converting means comprising a cylindrical shaped cam ring made up from two divided bodies.

Accordingly, when the cam ring is assembled with respect to the body, the two separated divided bodies can be assembled in close proximity with each other in a radial inward direction from the outer circumferential side of the body, and therefore, the cam ring can be assembled with respect to the body easily and reliably, thereby enhancing ease of assembly of the residual pressure release valve.

Further, hooks may be provided on the cam ring, which are capable of being inclined in a radial direction and engaging with an inner circumferential surface of the operating unit.

Furthermore, pin grooves, which extend along the axial direction of the body and through which the pin is inserted, may be formed in the body.

Still further, the cam ring may be made from a resin material.

The above and other objects features and advantages of the present invention will become more apparent from the following description when taken in conjunction with the accompanying drawings in which a preferred embodiment of the present invention is shown by way of illustrative example.

DESCRIPTION OF EMBODIMENTS

A preferred embodiment of a residual pressure release valve according to the present invention will be described below with reference to the accompanying drawings.

Figure 1:
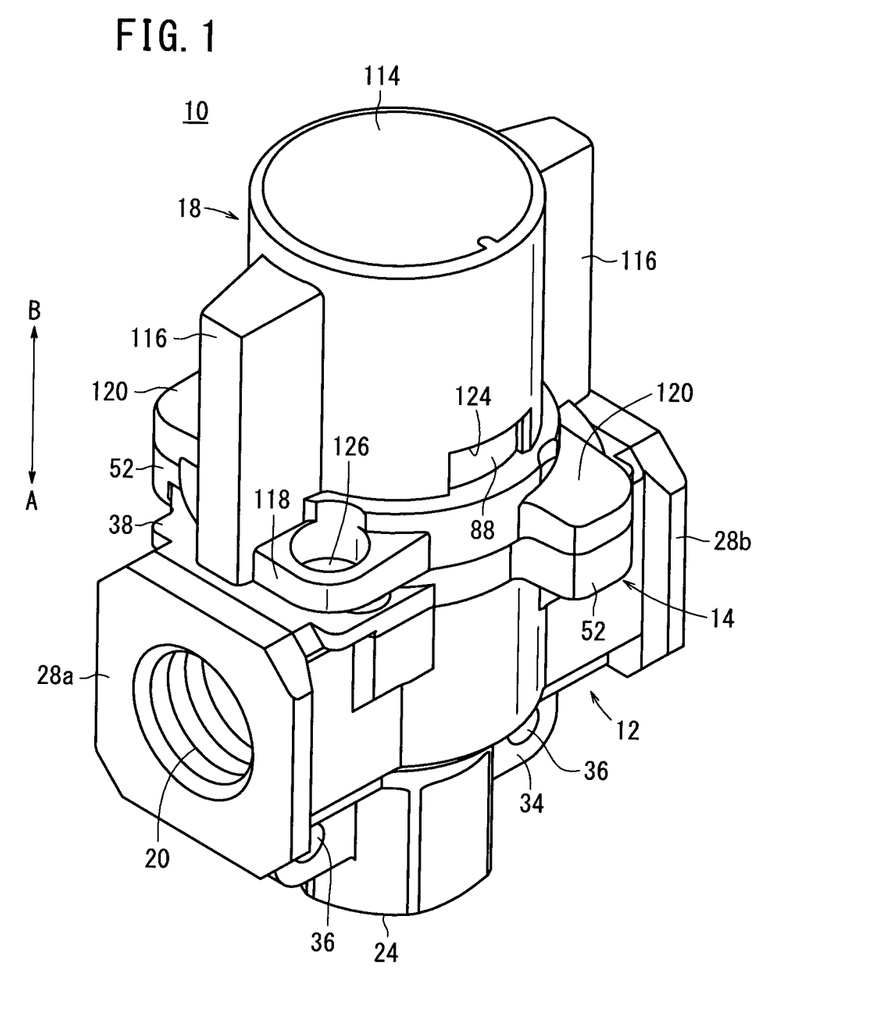
FIG. 1 is an exterior perspective view of a residual pressure release valve according to an embodiment of the present invention.

In FIG. 1, reference numeral 10 indicates a residual pressure release valve according to an embodiment of the present invention.

Figure 2:
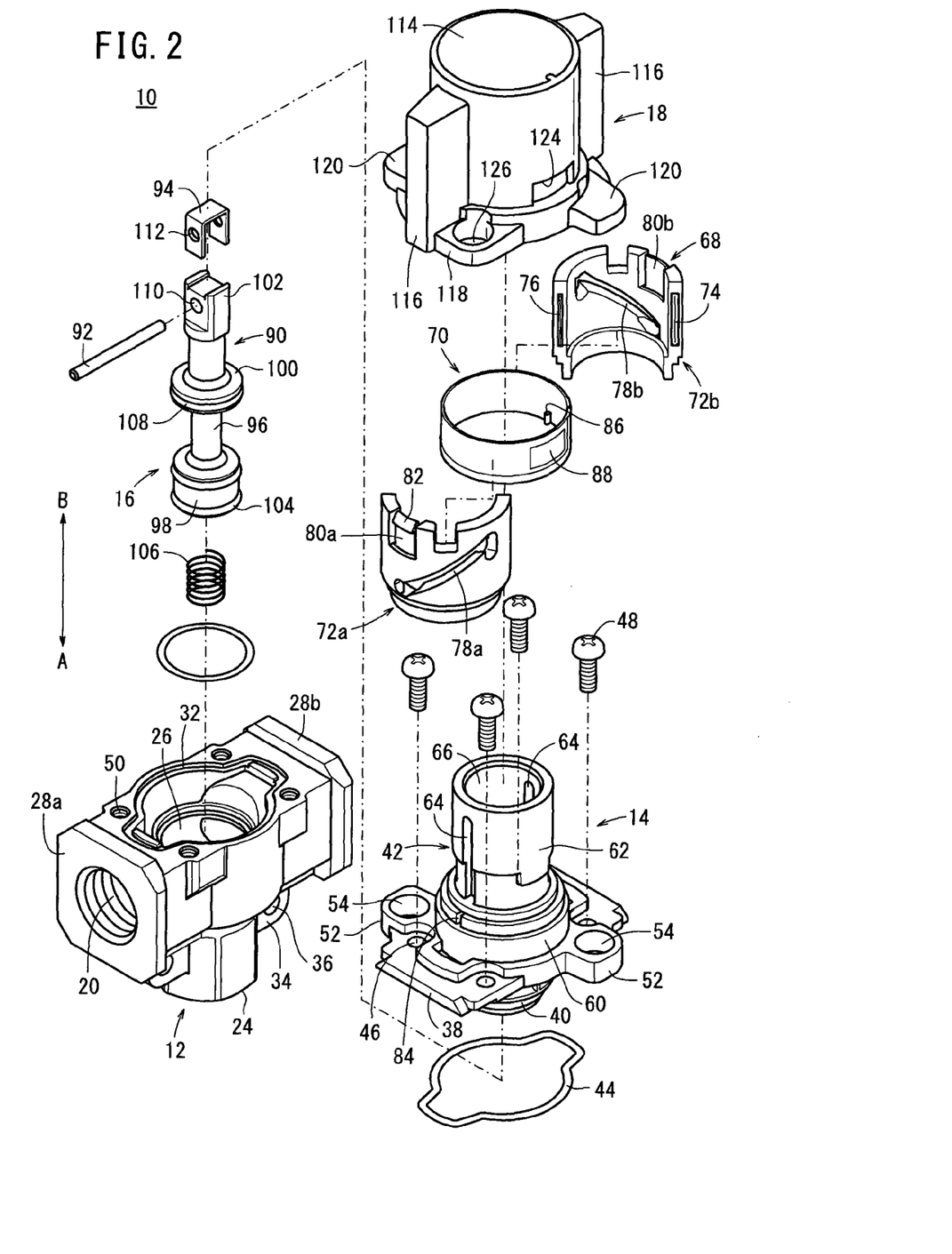
FIG. 2 is an exploded perspective view of the residual pressure release valve shown in FIG. 1.
Figure 3:
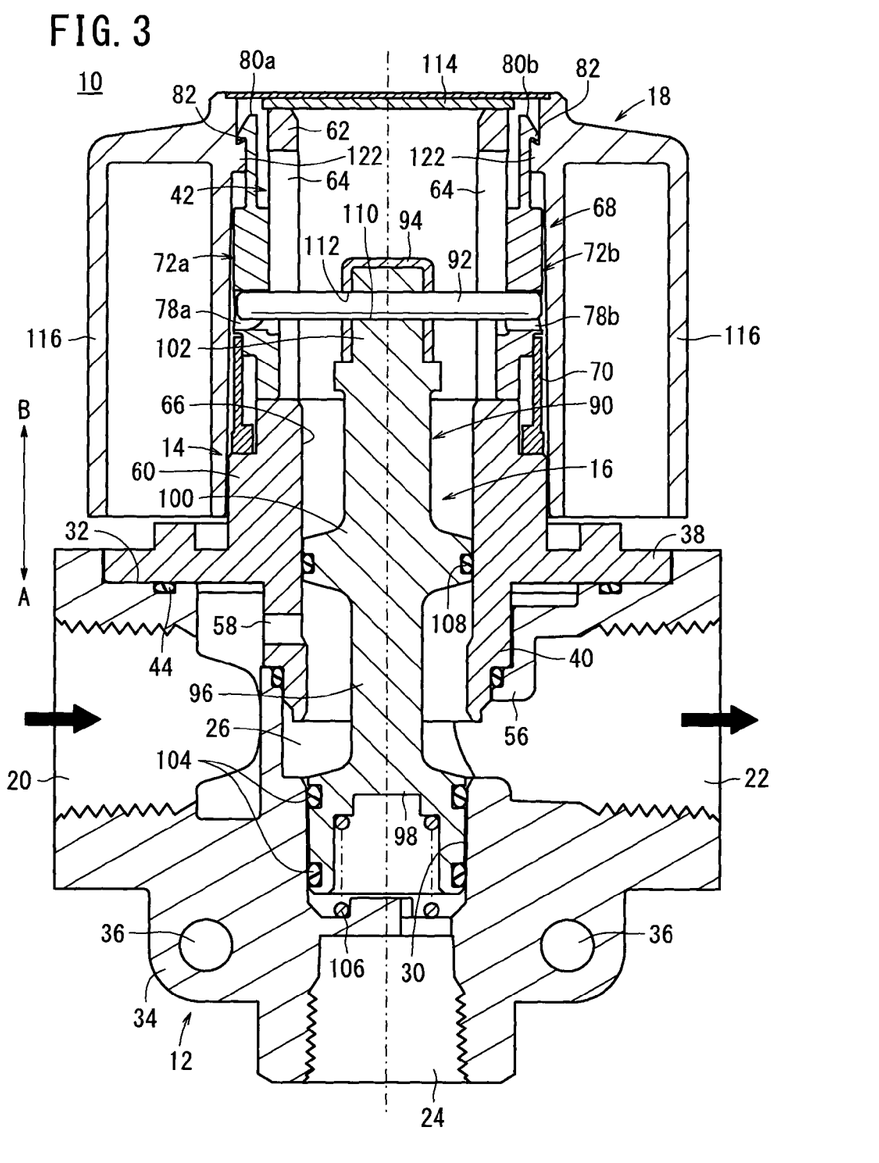
FIG. 3 is an overall cross sectional view of the residual pressure release valve shown in FIG. 1.
Figure 4:
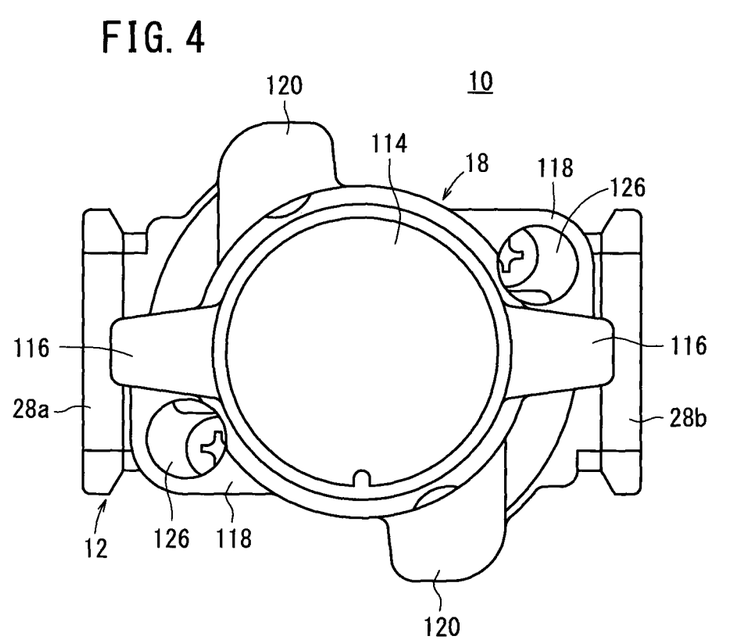
FIG. 4 is a plan view of the residual pressure release valve shown in FIG. 1.

As shown in FIGS. 1 through 3, the residual pressure release valve 10 includes a body 12, a bonnet (body) 14 connected to an upper part of the body 12, a valve mechanism 16 disposed in the interior of the body 12 and the bonnet 14, and a handle (operating unit) 18 provided rotatably on an upper part of the bonnet 14.

The body 12 is equipped with a first port 20, which opens on one side thereof and is connected to a non-illustrated fluid pressure device, a second port 22, which opens on another side and is connected to another non-illustrated fluid pressure device, a discharge port (third port) 24, which opens downwardly (in the direction of the arrow A) perpendicular to the first and second ports 20, 22, and a communication chamber 26, which communicates respectively with the first and second ports 20, 22 and the discharge port 24. More specifically, the residual pressure release valve 10 is a three-port valve including the first and second ports 20, 22 and the discharge port 24 in the body 12.

The first and second ports 20, 22 open respectively in substantially parallel directions perpendicular to the axis of the body 12, and in the vicinity of the first and second ports 20, 22, attachment sections 28a, 28b are formed respectively (see FIG. 1), which project in directions away from an opening 32 in communication with the first and second ports 20, 22. The attachment sections 28a, 28b are used when non-illustrated fluid pressure devices are connected with respect to the body 12 through joint members, or the like.

The communication chamber 26 communicates with the discharge port 24 downwardly along the axial direction (the direction of the arrow A) of the body 12. An accommodating hole 30, through which a valve (valve plug) 90 constituting the valve mechanism 16 is inserted, is formed between the communication chamber 26 and the discharge port 24. The accommodating hole 30 is formed with a substantially constant diameter and a predetermined depth in the axial direction (the direction of arrows A and B).

On the other hand, the upper part of the body 12 includes the opening 32, which opens upwardly. The opening 32 communicates with the communication chamber 26, with a portion of the bonnet 14 being inserted therein from above and arranged in the interior of the communication chamber 26.

Further, fastening flanges 34 are formed on a side portion of the discharge port 24, which project in directions away from the discharge port 24. The fastening flanges 34 are formed on opposite sides with respect to the outer circumferential surface of the discharge port 24, and are formed with a pair of holes 36 therein, through which non-illustrated bolts may be inserted. In addition, by screw-engagement of the bolts, which are inserted through the holes 36, with a wall surface or another member, the residual pressure release valve 10 can be fixed to the wall surface or the like through the body 12.

The bonnet 14 includes a plate shaped base portion 38, an insertion member 40 formed on a lower part of the base portion 38 for insertion into the interior of the body 12, and a cylindrical portion 42 formed on an upper part of the base portion 38.

The base portion 38 is formed with an elongate shape so as to seal the opening 32 of the body 12. After a seal ring 44 has been inserted into a seal groove formed on an upper surface of the body 12, by installing the base portion 38 in the opening 32, the opening 32 is sealed, and the seal ring 44 prevents leakage of pressure fluid between the body 12 and the bonnet 14.

Further, four through holes 46 are formed in the base portion 38, the four through holes 46 being separated in a radial outward direction with respect to the outer circumferential surfaces of the insertion member 40 and the cylindrical portion 42. Connecting bolts 48, which are inserted respectively through the through holes 46, are screw-engaged respectively into four screw holes 50 that are provided in the vicinity of the opening 32 of the body 12, whereby a portion of the bonnet 14 is inserted into the communication chamber 26, and the body 12 and the bonnet 14 are connected together in a condition in which the base portion 38 seals the opening 32.

Furthermore, first projecting tabs 52 are formed on the bonnet 14 as a pair, so as to project radially outward from the outer circumferential surface of the cylindrical portion 42. The first projecting tabs 52 are formed with substantially rectangular shapes in cross section and are disposed at positions on mutually opposite sides about the cylindrical portion 42. In addition, first lock holes 54 are formed respectively in the first projecting tabs 52, which penetrate in the thickness direction (the direction of arrows A and B) of the first projecting tabs 52. In greater detail, when the bonnet 14 is installed on the body 12, the first projecting tabs 52 are located on mutually opposite sides sandwiching the axis of the first and second ports 20, 22 therebetween, and further, are provided at positions separated by 180° about the axis of the cylindrical portion 42.

Stated otherwise, the first projecting tabs 52 are disposed at positions inclined respectively by predetermined angles with respect to the longitudinal direction of the base portion 38 of the bonnet 14, and with respect to a perpendicular direction perpendicular to the aforementioned longitudinal direction.

The insertion member 40 is formed in a cylindrical shape and is inserted through the opening 32 of the body 12 into the interior of the communication chamber 26. The insertion member 40 is retained in the communication chamber 26 by a retaining part 56, which is formed in the communication chamber 32. Thus, the bonnet 14 is fixed in a suitably positioned condition with respect to the body 12. Further, communication holes 58 that penetrate in the radial direction are formed in plurality along the circumferential direction of the insertion member 40, whereby the first port 20 communicates with the interior of the insertion member 40 through the communication holes 58. More specifically, the first port 20 and the communication chamber 26 communicate through the communication holes 58.

The cylindrical portion 42 projects upwardly (in the direction of the arrow B) by a predetermined height with respect to the base portion 38, and comprises a large diameter portion 60 joined to an upper surface of the base portion 38, and a small diameter portion 62, which is reduced in diameter and is formed on an upper part of the large diameter portion 60. A pair of pin grooves 64 that extend in the axial direction (the direction of arrows A and B) are formed on the small diameter portion 62. The cylindrical portion 42 is disposed coaxially with the insertion member 40.

The pin grooves 64 extend in straight lines from the top of the small diameter portion 62 to where the small diameter portion 62 adjoins with the large diameter portion 60, and penetrate in a radial direction of the small diameter portion 62. Further, one of the pin grooves 64 and the other of the pin grooves 64 are formed at mutually opposite positions about the axis of the cylindrical portion 42.

Further, in the interior of the cylindrical portion 42, a through hole 66 is formed that penetrates with a substantially constant diameter in the axial direction (the direction of arrows A and B). The through hole 66 is formed in a straight line so as to penetrate through the cylindrical portion 42, the base portion 38 and the insertion member 40, and also is formed with the same diameter as the diameter of the accommodating hole 30 in the body 12.

On the other hand, a cylindrically shaped cam ring 68 is disposed on the outer circumferential side of the small diameter portion 62 of the cylindrical portion 42, and a ring body 70 is disposed so as to cover the lower end of the cam ring 68 as well as a part of the small diameter portion 62.

The cam ring 68 is made, for example, from a resin material, and is constituted from two separate divided bodies 72a, 72b, which are circularly arc shaped in cross section, thereby forming a cylindrical body, which is annular in cross section, by connecting together the separate two divided bodies in the axial direction (the direction of arrows A and B). As shown in FIG. 2, on the adjoining surfaces of the divided bodies 72a, 72b, an elongate open recess 74 is formed in one of the adjoining surfaces, and a cross-sectionally elongate projection 76 is formed in the other adjoining surface. The cam ring 68 is not limited to being formed from a resin material, and may also be formed from a metal material, for example.

In addition, when the two divided bodies 72a, 72b are assembled together, at the same time that the adjoining surfaces come into abutment, the projection 76 of the one divided body 72a is inserted into the recess 74 on the other divided body 72b, and the projection 76 of the other divided body 72b is inserted into the recess 74 on the one divided body 72a, whereby the two divided bodies 72a, 72b are connected mutually together.

Cam grooves 78a, 78b are formed along the circumferential direction of the divided bodies 72a, 72b. The cam grooves 78a, 78b are inclined at a predetermined angle with respect to the axial direction (the direction of arrows A and B) of the divided bodies 72a, 72b. Further, the cam grooves 78a, 78b, for example, are formed with a fixed width dimension, one end thereof being positioned on a lower side (in the direction of the arrow A) of the divided bodies 72a, 72b, and the other end thereof being positioned on an upper side (in the direction of the arrow B), which is elevated with respect to the one end.

Further, hooks 80a, 80b, which are capable of being inclined in a radial inward direction, are provided on upper parts of the divided bodies 72a, 72b, so that when the handle 18 is installed on the outer circumferential side of the cam ring 68, claws 82 of the hooks 80a, 80b engage with engagement parts 122, which are formed on the inner circumferential surface of the handle 18. Consequently, the cam ring 68 is engaged with the handle 18 through the pair of hooks 80a, 80b, and the cam ring 68 is made integrally rotatable together with the handle 18.

The ring body 70 is arranged on the outer circumferential side of the large diameter portion 60 on the bonnet 14. Rotational displacement of the ring body 70 with respect to the bonnet 14 is prevented due to projections 86 on the inner circumferential surface of the ring body 70 being inserted into grooves 84 formed on the outer circumference of the large diameter portion 60. On the outer circumferential surface of the ring body 70, a display 88 is provided for indicating the flow condition of the pressure fluid in the residual pressure release valve 10 based on the rotational position of the handle 18.

The valve mechanism 16 includes a valve 90, which is elongated along the axial direction, and a connecting cover 94 that retains the pin 92, which is brought into engagement with the cam ring 68 and provided on the upper part of the valve 90.

The valve 90 is made up from a shaft 96 having a predetermined length along the axial direction (in the direction of arrows A and B), a valve member 98 provided on a lower end of the shaft 96 and which is accommodated in the communication chamber 26 of the body 12, a guide member 100 separated by a predetermined distance with respect to the valve member 98, and a connecting member 102, which is separated by a predetermined distance with respect to the guide member 100 and is disposed on the upper end of the shaft 96.

The valve member 98 is formed with a bottomed tubular shape, which is expanded in diameter in a radial outward direction with respect to the shaft 96, and a pair of first o-rings 104 are provided on the outer circumferential surface thereof, separated by a predetermined distance in the axial direction. A spring 106 is installed in the interior of the valve member 98 between the valve member 98 and the inner wall surface of the discharge port 24. The spring 106 is disposed in the interior of the accommodating hole 30. The valve 90 is urged by the elastic force of the spring 106 via the valve member 98 in a direction (the direction of the arrow B) to separate away from the discharge port 24.

The guide member 100 is expanded in diameter in a radial outward direction with respect to the shaft 96, and the outer circumferential surface thereof is in sliding contact with an inner circumferential surface of the through hole 66 of the bonnet 14. As a result of a second o-ring 108, which is mounted on the outer circumferential surface, coming into abutment against the inner circumferential surface, leakage of pressure fluid between the guide member 100 and the bonnet 14 is prevented. More specifically, due to being in sliding contact with the through hole 66 of the bonnet 14, the guide member 100 performs a guiding function to guide the valve 90 in the axial direction (the direction of arrows A and B).

The connecting member 102 is formed with a substantially rectangular shape in cross section. The connecting member 102 is covered by a connecting cover 94, which is formed with a U-shape in cross section and is mounted thereon from above, and further comprises a first pin hole 110 that penetrates through the valve 90 in a direction perpendicular to the axial direction. In addition, in a condition in which the connecting cover 94 is mounted on the connecting member 102, the first pin hole 110 and second pin holes 112 of the connecting cover 94 are arranged coaxially, and by insertion of the pin 92 respectively therein, the connecting cover 94 is retained with respect to the connecting member 102. The length of the pin 92 is set so that opposite ends of the pin 92 project with respect to the side surfaces of the connecting member 102.

In a state in which the pin 92 is inserted through the connecting member 102 and the connecting cover 94, opposite ends of the pin 92 are inserted respectively into the pin grooves 64 of the bonnet 14, and on the outer circumferential side of the bonnet 14, opposite ends of the pin 92 are inserted respectively through the cam grooves 78a, 78b of the cam ring 68. More specifically, as a result of the pin 92, which is inserted through the connecting member 102 of the valve 90, being inserted into the pin grooves 64 of the bonnet 14, the valve 90 is held in a state in which rotational displacement thereof is restricted, and only displacement in the axial direction (the direction of arrows A and B) is permitted.

Figure 6:
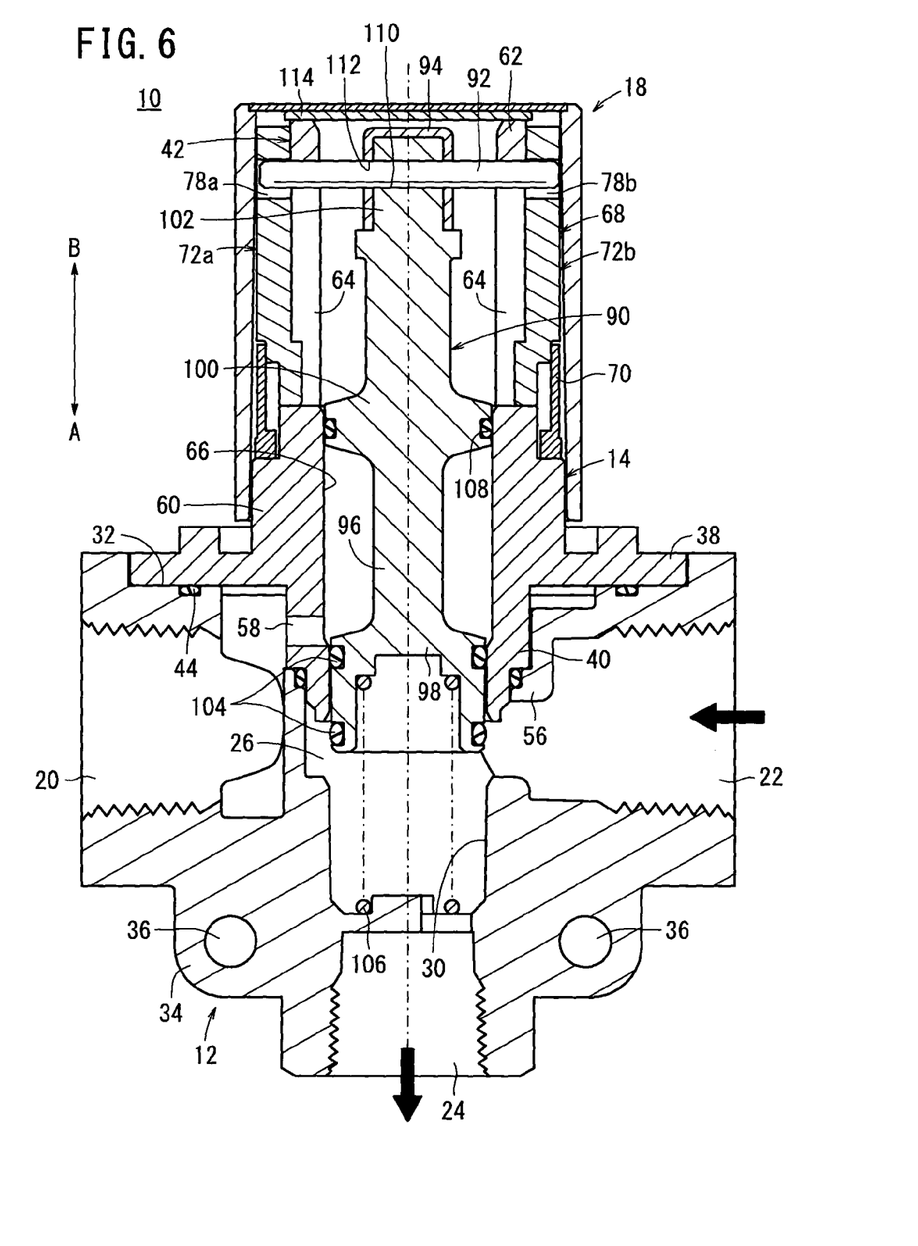
FIG. 6 is an overall cross sectional view of the residual pressure release valve, showing a release condition in which the handle is rotated as in FIG. 5, and whereby a second port and a discharge port are placed in communication with each other.

Further, as shown in FIG. 3, in a state in which the valve 90 is displaced downwardly (in the direction of the arrow A) such that the valve member 98 is accommodated in the accommodating hole 30 of the body 12, the pin 92 is positioned at one end of the cam grooves 78a, 78b, and as shown in FIG. 6, in a state in which the valve 90 is displaced upwardly (in the direction of the arrow B) such that the valve member 98 is accommodated in the through hole 66 of the bonnet 14, the pin 92 is positioned at the other end of the cam grooves 78a, 78b.

The handle 18 is equipped with a main body portion 114 formed in a bottomed cylindrical shape, a pair of grips 116 that project in radial outward directions with respect to the outer circumferential surface of the main body portion 114, a pair of second projecting tabs 118 that project in radial outward directions on the bottom end of the main body portion 114, and third projecting tabs 120, which are disposed so as to intersect with the second projecting tabs 118. Moreover, the grips 116 are disposed at respective positions substantially symmetrical with respect to the center of the main body portion 114, so as to enable the grips 116 to be gripped by an operator (not shown) when the handle 18 is rotated.

In the interior of the main body portion 114, a pair of engagement parts 122 are formed, which project in a radial inward direction in the vicinity of the top of the bottomed shape thereof. The cam ring 68 is fixed with respect to the handle 18 through engagement of the hooks 80a, 80b of the cam ring 68 with the engagement parts 122.

Further, as shown in FIGS. 1 and 2, a window 124 is provided on the outer circumferential wall of the main body portion 114, which opens in a substantially rectangular shape and penetrates through the main body portion 114, so that the display 88 of the ring body 70 can be viewed from the exterior through the window 124. The display 88 may have indication on the supply condition (e.g., supply, release, etc.) of the pressure fluid currently being carried out by the residual pressure release valve 10, so that by observing the display 88 from the exterior, the supply condition can easily and reliably be confirmed.

The second projecting tabs 118 are formed with substantially rectangular shapes in cross section and are disposed in proximity to the grips 116 at positions on mutually opposite sides about the main body portion 114. Second lock holes 126 that penetrate therethrough in the thickness direction (the direction of arrows A and B) are formed respectively in the second projecting tabs 118. More specifically, the second projecting tabs 118 are arranged at positions separated mutually by 180° about the axis of the main body portion 114.

On the other hand, the third projecting tabs 120 are substantially rectangular shaped in cross section and are disposed at positions on mutually opposite sides about the center of the main body portion 114, and at positions separated by 90° with respect to the second projecting tabs 118.

Stated otherwise, the third projecting tabs 120 also are arranged at positions separated mutually by 180° about the axis of the main body portion 114.

In addition, the handle 18 is disposed so as to cover the cylindrical portion 42 of the bonnet 14 installed in the body 12, such that the handle 18 is supported by the top of the main body portion 114 thereof coming into abutment with the upper part of the cylindrical portion 42.

The residual pressure release valve 10 according to the embodiment of the present invention is constructed basically as described above. Next, operations and advantages of the residual pressure release valve 10 will be described. A supply condition, in which the first port 20 and the second port 22 are in communication with each other as shown in FIG. 3, will be described as an initial condition.

First, in the aforementioned supply condition, as shown in FIG. 3, the valve 90 is pressed downwardly by action of the pin 92 in opposition to the elastic force of the spring 106, and due to the valve member 98 being accommodated in the interior of the accommodating hole 30, communication between the discharge port 24 and the communication chamber 26 is blocked, while at the same time, the first port 20 and the second port 22 communicate through the communication chamber 26. Further, the handle 18 is positioned such that the third projecting tabs 120 confront the first projecting tabs 52 (see FIG. 1).

In addition, pressure fluid is supplied to the interior of the body 12 from a fluid pressure device connected to the first port 20, and the pressure fluid passes through the first port 20 and the communication chamber 26 and flows to another fluid pressure device, which is connected to the second port 22. In this case, the display 88 displays the notation "supply condition" in the window 124 of the handle 18.

Further, the first projecting tabs 52 are covered by the third projecting tabs 120 of the handle 18, and the first lock holes 54 are in a condition such that the first lock holes 54 cannot be viewed from above.

Next, a case will be described in which the pressure fluid on the downstream side of the second port 22 is discharged through the discharge port 24.

Figure 5:
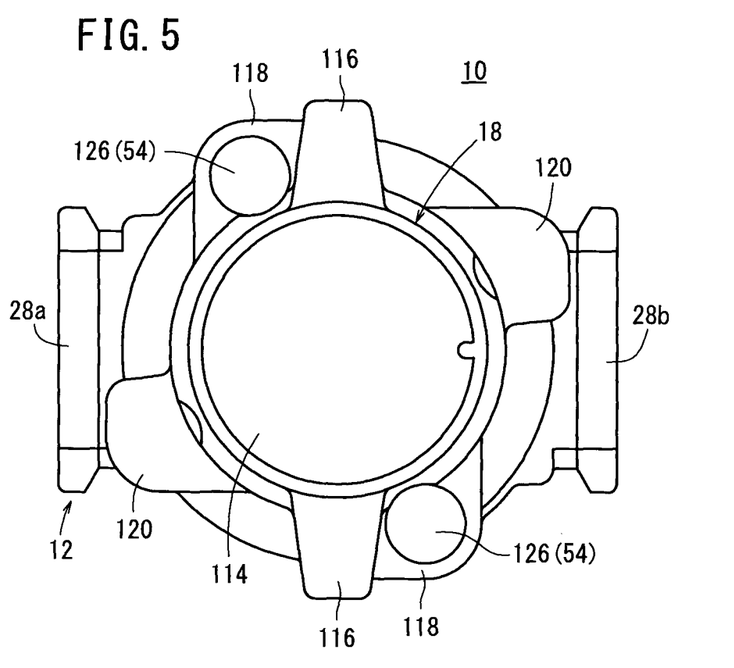
FIG. 5 is a plan view showing a condition in which a handle is rotated by 90° in the residual pressure release valve of FIG. 4.

First, an operator (not shown) grips the handle 18 and as shown in FIG. 5, turns the handle 18 counterclockwise through 90° while viewing the residual pressure release valve 10 from above. Consequently, the handle 18 is rotated together with the cam ring 68, and thus the pin 92 moves gradually toward the other end side of the cam grooves 78a, 78b accompanying rotation of the cam ring 68. As a result, as shown in FIG. 6, the valve 90, the pin 92 of which is inserted through the connecting member 102, rises gradually upon movement of the pin 92, and the valve member 98 moves away from the accommodating hole 30, through the communication chamber 26, and is inserted into the through hole 66. At this time, since the pin 92 is inserted through the pin grooves 64 of the bonnet 14, upon rotation of the handle 18 and the cam ring 68, the valve 90 is not rotated, but is displaced only in the axial direction (the direction of the arrow B).

More specifically, the pin 92, which is inserted through the cam ring 68 and the cam grooves 78a, 78b of the cam ring 68, functions as a converting means for converting rotational motion of the handle 18 into linear motion and transferring the linear motion to the valve 90.

As a result, the blocked state of the discharge port 24 is released, the second port 22 and the discharge port 24 are placed in communication through the communication chamber 26, and communication between the communication holes 58 and the communication chamber 26 is blocked by the valve member 98 that is inserted in the through hole 66. More specifically, communication between the first port 20 and the second port 22 is blocked, and a condition is brought about in which the second port 22 and the discharge port 24 are placed in communication.

Consequently, a release condition is brought about in which the residual pressure fluid remaining on the side of the second port 22 (downstream side) is discharged to the exterior through the discharge port 24. In this case, although fluid pressure continues to be supplied, since flow of the pressure fluid supplied to the first port 20 is blocked by the valve member 98, the pressure fluid does not flow through to the communication chamber 26. Further, in this case, the display 88 displays the notation "release condition" in the window 124 of the handle 18.

Further, by rotating the handle from the aforementioned supply condition, the second projecting tabs 118 and the first projecting tabs 52 of the bonnet 14 overlap one another in the vertical direction (the direction of arrows A and B) and a state is brought about in which the second lock holes 126 and the first lock holes 54 are made coaxial, with the second lock holes 126 and the first lock holes 54 penetrating coaxially therethrough. Thus, for example, after an unillustrated lock means such as a padlock or the like has been inserted through the first and second lock holes 54, 126 and locked, a locked state is achieved in which rotational displacement of the handle 18 is restricted, so that mistaken rotation of the handle 18 away from the release condition, in which the second port 22 and the discharge port 24 are in communication, is prevented, and the release condition is reliably maintained.

In the foregoing manner, with the present embodiment, the cam ring 68 including the cam grooves 78a, 78b is constituted from two divided bodies 72a, 72b which are divided in two pieces along the axial direction (the direction of arrows A and B). By assembling together the divided bodies 72a, 72b, when the cam ring 68 is attached with respect to the cylindrical portion 42 of the bonnet 14, the divided bodies 72a, 72b can be made to approach one another in a radial inward direction from the outer circumferential side of the cylindrical portion 42. Owing thereto, it is possible for the cam ring 68 to be assembled easily with respect to the bonnet 14, along with enhancing ease of assembly of the residual pressure release valve 10.

Further, because the cam ring 68 is made from a resin material, the cam ring 68 can be made lighter in weight compared to the case of forming the cam ring 68 from a metal material.

Furthermore, by providing the pair of hooks 80a, 80b on the outer circumferential wall of the cam ring 68, through a simple operation of inserting the cam ring 68 into the handle 18 such that the projections 86 are placed in engagement, the cam ring 68 can reliably and easily be attached to the handle 18. Stated otherwise, ease of assembly of the residual pressure release valve 10 can be enhanced. Moreover, compared to the case of fixing the cam ring 68 with respect to the handle 18 by a bolt or the like, the number of parts can be reduced, and ease of assembly can be enhanced.

The residual pressure release valve of the present invention is not limited to the embodiment described above, but various additional or modified structures may be adopted therein without deviating from the essence and gist of the present invention.

The invention claimed is:

1. A residual pressure release valve comprising:
a body including first and second ports through which a pressure fluid is supplied and discharged, and a third port that communicates with the first and second ports through a communication chamber;
a valve mechanism including a valve plug disposed inside the body for switching a flow-through condition of the pressure fluid between the first through third ports, and an operating unit for operating the valve mechanism;
converting means disposed rotatably with respect to the body between the operating unit and the body for converting rotational movement of the operating unit into linear movement and transferring the linear movement to the valve plug;
wherein the converting means includes a pin inserted through the valve plug, and a cylindrical shaped cam ring including an inclined groove therein for guiding the pin, the cam ring including two divided bodies separable from each other in a radial direction; and
a pin groove formed in the body, which pin groove extends along an axial direction of the body and through which the pin is inserted.

2. The residual pressure release valve according to claim 1, further comprising a hook provided on the cam ring, which is configured to be inclined in a radial direction and to engage with an inner circumferential surface of the operating unit.

3. The residual pressure release valve according to claim 1, wherein the cam ring is made from a resin material.

4. The residual pressure release valve according to claim 1, wherein:

the body further includes a first projecting tab that projects in a direction perpendicular to an axial direction of the body, and a first lock hole formed in the first projecting tab, which penetrates therethrough in a thickness direction of the first projecting tab;
the operating unit includes a second projecting tab that projects in a direction perpendicular to an axial direction of the operating unit, and a second lock hole formed in the second projecting tab, which penetrates therethrough in a thickness direction of the second projecting tab; and
when rotational movement of the operating unit is transmitted to the valve plug and the flow-through condition of the pressure fluid is switched, the positions of the first lock hole and the second lock hole are switched from being non-coaxial to coaxial.

5. The residual pressure release valve according to claim 1, further comprising a recess formed in a joint surface on one of the two divided bodies, and a projection configured to be inserted into the recess formed on a joint surface on the other of the two divided bodies.

6. The residual pressure release valve according to claim 1, further comprising a cover member provided at an end of the valve plug to cover the end of the valve plug, wherein a pin hole into which the pin is inserted is formed in the cover member and the end of the valve plug.

7. The residual pressure release valve according to claim 1, further comprising:
a ring body provided at an end of the cylindrical shaped cam ring to cover part of the end of the cylindrical shaped cam ring; and
a display unit provided on an outer circumferential surface of the ring body to indicate a flow condition of pressure fluid based on a rotational position of the operating unit.

* * * * *